(12) United States Patent
Raule

(10) Patent No.: US 9,790,670 B2
(45) Date of Patent: Oct. 17, 2017

(54) ARRANGEMENT FOR HANDLING A LIQUID MEDIUM

(75) Inventor: Steffen Raule, Triebweg (DE)

(73) Assignee: Honeywell Technologies SARL, Rolle (CH)

( * ) Notice: Subject to any disclaimer, the term of this patent is extended or adjusted under 35 U.S.C. 154(b) by 349 days.

(21) Appl. No.: 14/125,037

(22) PCT Filed: May 7, 2012

(86) PCT No.: PCT/EP2012/001949
§ 371 (c)(1),
(2), (4) Date: Sep. 19, 2014

(87) PCT Pub. No.: WO2012/167861
PCT Pub. Date: Dec. 13, 2012

(65) Prior Publication Data
US 2015/0240463 A1 Aug. 27, 2015

(30) Foreign Application Priority Data
Jun. 9, 2011 (DE) .......... 10 2011 106 115

(51) Int. Cl.
E03C 1/10 (2006.01)
F16K 17/04 (2006.01)
(Continued)

(52) U.S. Cl.
CPC .......... *E03C 1/106* (2013.01); *E03B 7/075* (2013.01); *E03B 7/077* (2013.01); *E03C 1/10* (2013.01);
(Continued)

(58) Field of Classification Search
CPC .......... E03C 1/106; Y10T 137/88054; Y10T 137/87917; Y10T 137/7825; E03B 7/077;
(Continued)

(56) References Cited

U.S. PATENT DOCUMENTS 3,387,622 A * 6/1968 Weinstein ............. F16K 31/145
137/495
6,343,618 B1 * 2/2002 Britt ...................... F16K 15/035
137/512
(Continued)

FOREIGN PATENT DOCUMENTS

CH 256061 7/1948
DE 960942 3/1957
(Continued)

OTHER PUBLICATIONS

International Search Report for Corresponding Application No. PCT/EP2012/001949, 3 pages, mailed Oct. 8, 2012.
(Continued)

*Primary Examiner* — Atif Chaudry
(74) *Attorney, Agent, or Firm* — Seager, Tufte & Wickhem, LLP

(57) ABSTRACT

An arrangement for managing a liquid medium, such as water, combines a pressure-reducing valve with two backflow prevention valves. Both the pressure-reducing valve and the two backflow prevention valves may be integrated into a common housing, specifically with both backflow prevention valves in an inlet chamber of the housing, wherein the inlet chamber and an outlet chamber of the housing are either fluidly coupled or isolated from one another by the pressure-reducing valve depending on the outlet chamber pressure prevailing in the outlet chamber. In some instances, a manually actuatable shut-off valve may be integrated into the housing. The manually actuatable shut-off valve may selectively keep the pressure-reducing valve in a closed position or allow the automatic opening and closing of the pressure-reducing valve depending on the outlet chamber pressure prevailing in the outlet chamber.

2 Claims, 2 Drawing Sheets

Figure 1:
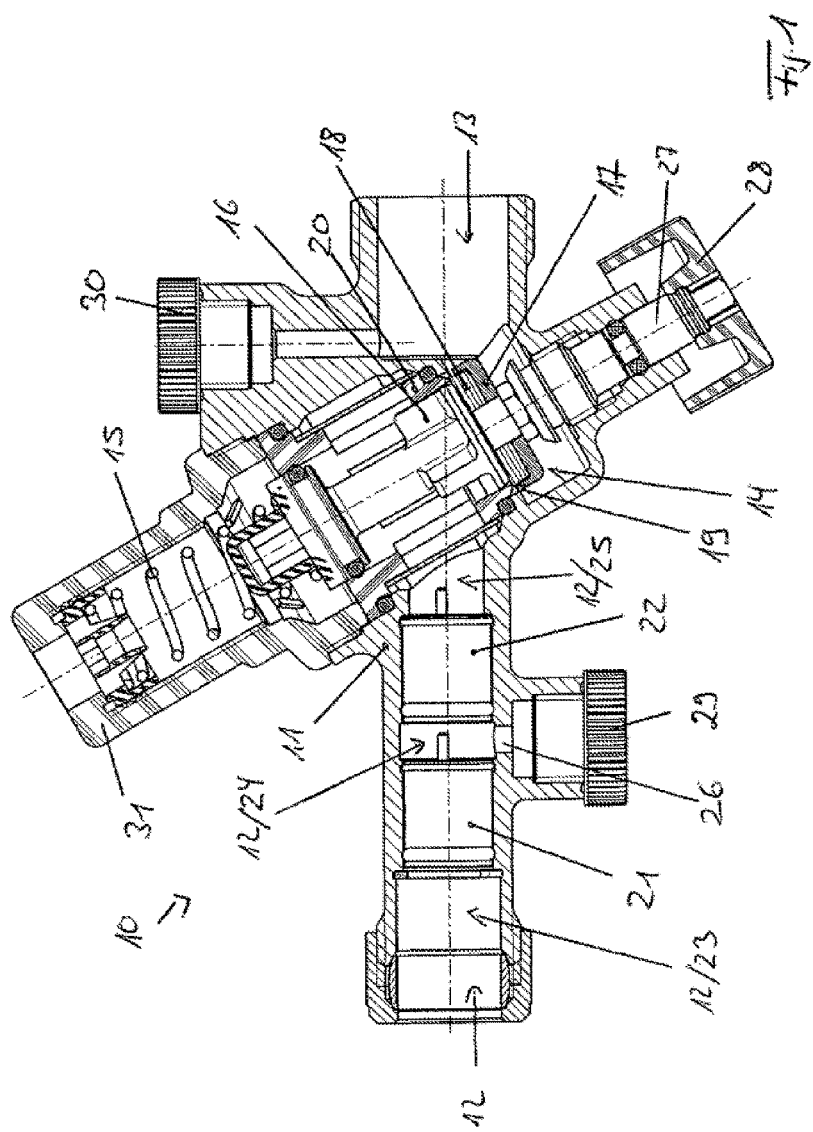

(51) Int. Cl.
*F16K 15/06* (2006.01)
*F16K 15/18* (2006.01)
*G05D 16/10* (2006.01)
*E03B 7/07* (2006.01)
*F24D 3/10* (2006.01)

(52) U.S. Cl.
CPC .......... *F16K 15/066* (2013.01); *F16K 15/188* (2013.01); *F16K 17/048* (2013.01); *F24D 3/1083* (2013.01); *G05D 16/10* (2013.01); *G05D 16/106* (2013.01); *Y10T 137/0396* (2015.04); *Y10T 137/3331* (2015.04); *Y10T 137/7825* (2015.04); *Y10T 137/87917* (2015.04); *Y10T 137/88054* (2015.04)

(58) Field of Classification Search
CPC .... F16K 15/066; F16K 15/188; F16K 17/048; G05D 16/106
USPC ..................................... 137/505.41
See application file for complete search history.

(56) References Cited

U.S. PATENT DOCUMENTS

| 6,396,404 B1* | 5/2002 | McHugh | G08B 21/0288 340/539.1 |
|---|---|---|---|
| 2004/0134537 A1* | 7/2004 | Noll | F16K 15/063 137/512 |
| 2006/0185744 A1 | 8/2006 | Hecking | |
| 2008/0178941 A1* | 7/2008 | Hecking | E03B 7/075 137/218 |

FOREIGN PATENT DOCUMENTS

| DE | 1425685 | 12/1968 |
|---|---|---|
| DE | 29606442 | 6/1996 |
| DE | 10103374 | 8/2002 |
| DE | 202005015270 | 12/2005 |
| DE | 102005010139 | 10/2006 |
| DE | 102006021800 | 2/2008 |
| DE | 102007005215 | 6/2008 |
| DE | 202010008759 | 3/2012 |
| EP | 1855061 | 11/2007 |
| EP | 1950354 | 7/2008 |
| FR | 929141 | 12/1947 |
| FR | 2511112 | 2/1983 |

OTHER PUBLICATIONS

International Preliminary Report on Patentability and Written Opinion for Corresponding Application No. PCT/EP2012/001949, 7 pages, mailed Dec. 27, 2013.
Cash ACME, "BFAC Combination Backflow Preventer and Pressure Reducing Valve," Specifications GA006, 2 pages, issue date Jan. 2008.
www.diychatroom.com/f7/pressure-reducer-valve-backflow-preventer-93908/, "Pressure Reduce Valve and Backflow Preventer—Plumbing," DIY Home Improvement, 6 pages, printed Jan. 8, 2014.
Honeywell, "CA295 Backflow Preventer Compact Construction with Threaded Connectors," Product Specification Sheet, 4 pages, 2009.
Honeywell, "D03 Pressue Reducing Valve," Product Specification Sheet, 2 pages, 2012.
Honeywell, "Potable Water," 1 page, printed Jan. 8, 2014.
Honeywell, "VF06 Filling Valve for Closed Heating Systems," Product Specification Sheet, 4 pages, 2011.
WATTS Regulator, "Series 911 Combination Fill Valve and Backflow Preventer," 1 page, 2003.

* cited by examiner

ARRANGEMENT FOR HANDLING A LIQUID MEDIUM

The invention relates to an arrangement for managing a liquid medium, in particular water, according to the preamble of claim 1.

The present invention relates to an arrangement for managing a liquid medium, in particular for managing water. Such arrangements are also known as fittings.

A large number of different fittings are known from practice. For example, fittings in the form of pressure regulators, in the form of pressure reducers, in the form of backflow preventers or in the form of system separators. Furthermore, fittings in the form of shut-off valves or in the form of filling valves are known. It is furthermore known to combine a plurality of such fittings, embodied as separate assemblies, with one another by screw connection during the construction of a system for managing a liquid medium, for example during the construction of a drinking water supply system or heating system. This causes not only a sealing requirement at the housing-side interfaces of the individual assemblies, but also a relatively large space requirement.

The invention is based on the object of creating a novel arrangement for managing a liquid medium, in particular water. This object is achieved by an arrangement water according to claim 1.

With the present invention, an arrangement for managing a liquid medium is proposed for the first time, which combines a pressure-reducing valve with two backflow prevention valves. Both the pressure-reducing valve and the two backflow prevention valves are integrated into the housing of the arrangement according to the invention, specifically with both backflow prevention valves in the inlet chamber of the housing, wherein the inlet chamber of the housing and the outlet chamber of the housing are either coupled or separated from one another by the pressure-reducing valve depending on the outlet chamber pressure prevailing in the outlet chamber.

The arrangement according to the invention for managing water accordingly provides high functional integration. As a result, interfaces between previously separate fittings and thus possible sealing points between the latter and also possible leaks can be reduced to a minimum. Furthermore, the space requirement can be reduced. Furthermore, a pressure drop can be reduced to a minimum. Downstream of the pressure-reducing valve, there is no pressure drop. The pressure drop in the two backflow prevention valves integrated into the inlet chamber is negligibly small on account of the pressure-reducing valve, which is arranged downstream of the two backflow prevention valves.

According to an advantageous development of the invention, the two backflow prevention valves, which are integrated into the inlet chamber of the housing and preferably have identical nominal widths, subdivide the inlet chamber into three subchambers, wherein a subchamber formed between the two backflow prevention valves has a minimized volume. On account of the minimization of the subchamber formed between the two backflow prevention valves, a stagnation volume can be minimized. On account of the use of identical nominal widths of the two backflow prevention valves, the number of different components can be reduced.

Preferably, a plurality of test connection pieces are furthermore integrated into the housing, specifically a first test connection piece connected to the inlet chamber of the housing and a second test connection piece connected to the outlet chamber of the housing.

By integrating the test connection pieces into the housing, further functional integration, a further reduction in interfaces and also a further reduction in the space requirement are possible.

In this case, the first test connection piece is connected to the subchamber, formed between the two backflow prevention valves, of the inlet chamber.

According to an advantageous development of the invention, a manually actuable shut-off valve is furthermore integrated into the housing, said shut-off valve keeping the pressure-reducing valve permanently closed in the closed position, and allowing the automatic opening and closing of the pressure-reducing valve, depending on the outlet chamber pressure prevailing in the outlet chamber, in the open position. As a result of the above integration of a manually actuable shut-off valve into the housing, further functional integration and thus a further reduction in interfaces and in space requirement are possible.

Figure 2:
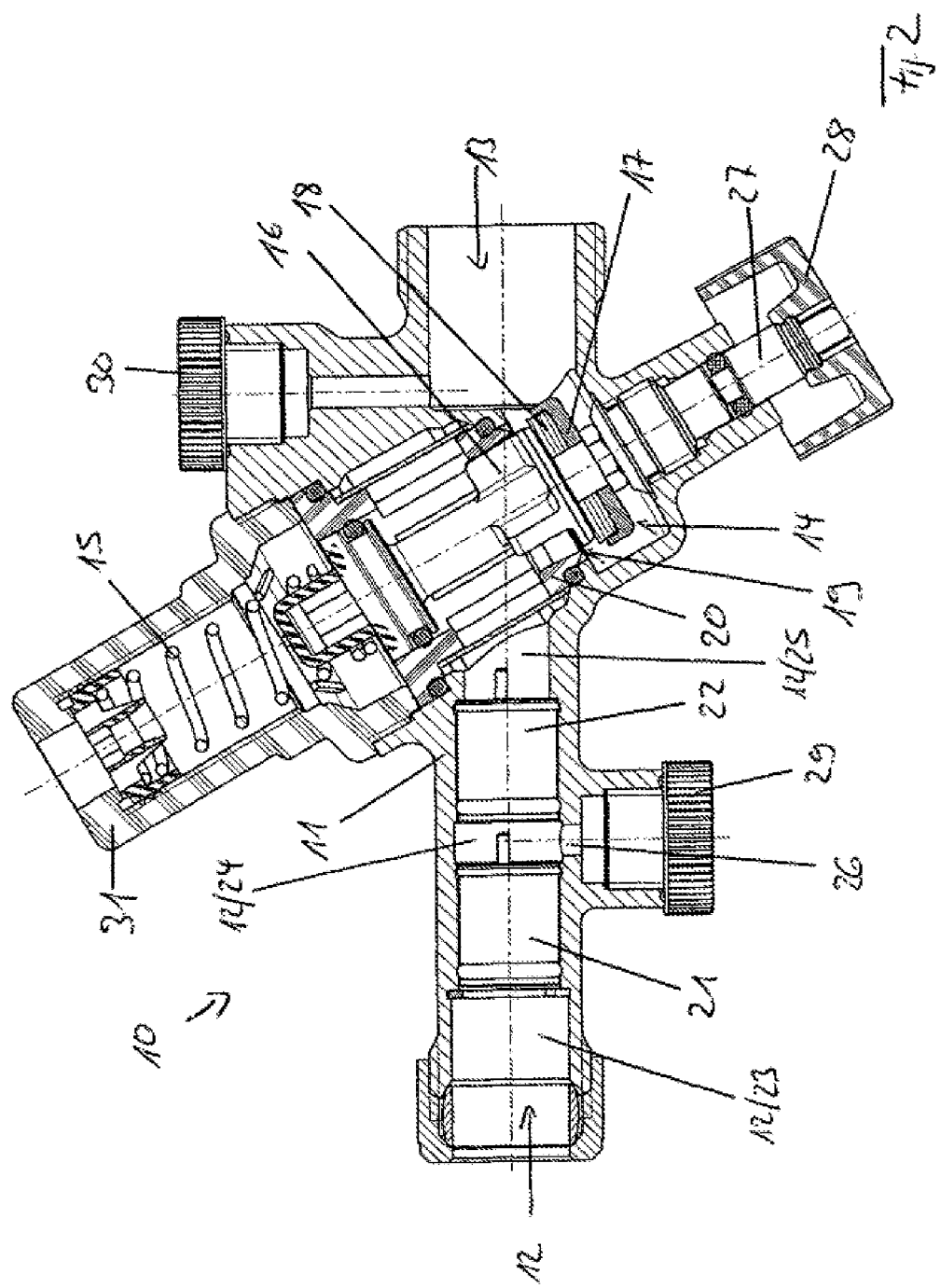

Preferred developments of the invention can be gathered from the dependent claims and the following description. In the following text, an exemplary embodiment of the invention is explained in more detail, without being limited thereto, with reference to the drawing, in which:

FIG. 1 shows a cross section through an arrangement according to the invention for managing a liquid medium in a first state thereof; and FIG. 2 shows a cross section through the arrangement according to the invention for managing a liquid medium in a second state thereof.

The present invention relates to an arrangement for managing a liquid medium, in particular a fitting for managing water, for example a fitting of a drinking water supply system.

FIGS. 1 and 2 show a cross section through a preferred exemplary embodiment of an arrangement 10 according to the invention for managing a liquid medium, wherein the arrangement 10 comprises a housing 11 which defines an inlet chamber 12 for the liquid medium and an outlet chamber 13 for same.

Integrated into the housing 11 of the arrangement 10 according to the invention is a pressure-reducing valve 14, via which the inlet chamber 12 and the outlet chamber 13 are either coupled to one another or separated from one another, depending on the outlet chamber pressure prevailing in the outlet chamber 13, specifically such that when the outlet chamber pressure prevailing in the outlet chamber 13 is higher than a limit value, the pressure-reducing valve is automatically closed in order to separate the inlet chamber 12 and the outlet chamber 13, whereas when the outlet chamber pressure prevailing in the outlet chamber 13 is lower than a limit value, the pressure-reducing valve 14 is automatically opened in order to couple the inlet chamber 12 and the outlet chamber 13.

The limit value for the outlet chamber pressure, below which the pressure-reducing valve 14 automatically opens, is determined by a spring element 15 of the pressure-reducing valve 14, said spring element 15 acting on a plunger 16 of the pressure-reducing valve 14 in the opening direction of same. A force which is dependent on the outlet chamber pressure prevailing in the outlet chamber 13 acts against this force provided by the spring element 15, specifically via a valve disk 17 of the pressure-reducing valve 14, said valve disk 17 being positioned in the outlet chamber 13.

This valve disk 17 accommodates a sealing element 18 which, when the outlet chamber pressure prevailing in the outlet chamber 13 is higher than the limit value determined by the spring element 15, presses the sealing element 18 of the pressure-reducing valve 14 against a valve seat 19 of the pressure-reducing valve (see FIG. 1), whereas when the outlet chamber pressure prevailing in the outlet chamber 13 is lower than the limit value predefined by the spring element 15, the sealing element 18 is lifted from the valve seat 19 (see FIG. 2). This basic function of a pressure-reducing valve 14 is familiar to the person skilled in the art addressed here.

The valve seat 19 for the sealing element 18 of the pressure-reducing valve 14 is provided by an insert 20 inserted into the housing 11, wherein the insert 20 is clamped in the housing 11 via a spring cap 31 screwed to the housing 11. Instead of such a plunger-controlled pressure-reducing valve 14, it is also possible for a diaphragm-controlled pressure-reducing valve to be used.

According to the invention, two backflow prevention valves 21 and 22 are integrated into the inlet chamber 12.

The two backflow prevention valves 21 and 22 which are integrated into the inlet chamber 12 subdivided the inlet chamber 12 into three subchambers 23, 24 and 25, specifically into a subchamber 23 which is upstream with respect to an upstream backflow prevention valve 21, into a subchamber 25 which is downstream with respect to a downstream backflow prevention valve 22, and into a central subchamber 24 positioned between the upstream backflow prevention valve 21 and the downstream backflow prevention valve 22.

The pressure-reducing valve 14 is connected between the downstream subchamber 25 of the inlet chamber 12 and the outlet chamber 13.

When the pressure-reducing valve 14 is automatically opened on the basis of the pressure prevailing in the outlet chamber 13, the backflow prevention valves 21 and 22 are also automatically opened, specifically in the case of medium removal from the outlet chamber 13. By contrast, when the pressure-reducing valve 14 is automatically closed on the basis of the outlet chamber pressure prevailing in the outlet chamber 13, the backflow prevention valves 21 and 22 are also automatically closed. As a result, high system security is provided for the fitting according to the invention.

The two backflow prevention valves 21 and 22 are integrated into the inlet chamber 12 such that the subchamber 24 formed between the two backflow prevention valves 21, 22 has a minimized volume. On account of the minimization of the volume of the subchamber 24 formed between the two backflow prevention valves 21, 22, a stagnation volume can be minimized.

The two backflow prevention valves 21 and 22 have preferably identical nominal widths. As a result of the use of identical nominal widths of the two backflow prevention valves 21, 22, the number of different components can be reduced.

A manually actuable shut-off valve 27 is preferably furthermore integrated into the housing 11 of the arrangement 10 and can be manually actuated from an adjusting screw 28. This shut-off valve 27 interacts with the pressure-reducing valve 14 such that the shut-off valve 27 keeps the pressure-reducing valve 14 permanently closed in the closed position, i.e. even when the pressure prevailing in the outlet chamber 13 drops below the predefined limit value. By contrast, when the shut-off valve 27 is open, it allows the pressure-reducing valve 14 to be opened and closed automatically depending on the outlet chamber pressure prevailing in the outlet chamber 13.

Furthermore, a plurality of test connection pieces are integrated into the housing 11 of the arrangement 10 according to the invention, specifically a first test connection piece 29 connected to the inlet chamber 12 of the housing 11 and a second test connection piece 30 connected to the outlet chamber 13 of the housing 11. Test devices can in each case be coupled to the arrangement 10 according to the invention via the two test connection pieces 29 and 30 in order, for example, to test the functionality of the respective backflow prevention valve 21 or 22 by tapping pressure.

According to FIGS. 1 and 2, the first test connection piece 29 is connected to the central subchamber 24, formed between the two backflow prevention valves 21, 22, of the inlet chamber 12 of the housing 11, specifically via a cutout 26. This allows pressure tapping, which is particularly advantageous for test purposes, between the two backflow prevention valves 21 and 22.

The arrangement 10 according to the invention is characterized by high functional integration. As a result, it is possible, when constructing a system for managing a liquid medium, for example when constructing a drinking water supply system, to reduce the number of interfaces between fittings which have previously been configured in a separate manner, and thus to reduce possible leaks between same.

Furthermore, the space requirement, which is required for example when constructing a drinking water supply system from the individual assemblies, can be reduced.

LIST OF REFERENCE SIGNS

10 Arrangement
11 Housing
12 Inlet chamber
13 Outlet chamber
14 Pressure-reducing valve
15 Spring element
16 Plunger
17 Valve disk
18 Sealing element
19 Valve seat
20 Insert
21 Backflow prevention valve
22 Backflow prevention valve
23 Subchamber
24 Subchamber
25 Subchamber
26 Cutout
27 Shut-off valve
28 Actuating means
29 Test connection piece
30 Test connection piece
31 Spring cap

The invention claimed is:

1. An arrangement for managing a liquid medium comprising:
a single piece housing having a longitudinal axis, wherein the housing defines an inlet chamber at a first end of the housing for the liquid medium and an outlet chamber at a second end of the housing for the liquid medium, said inlet chamber and said outlet chamber being coaxially aligned along the longitudinal axis of the single piece housing and being separated from one another or coupled to one another by a pressure-reducing valve that is integrated with said housing such that when an outlet chamber pressure prevailing in the outlet chamber is lower than a limit value, the pressure-reducing valve is automatically opened in order to couple the inlet chamber and the outlet chamber, and such that when the outlet chamber pressure prevailing in the outlet chamber is higher than the limit value, the pressure-reducing valve is automatically closed in order to separate the inlet chamber and the outlet chamber;

a first backflow prevention valve in the inlet chamber of the housing coaxially aligned along the longitudinal axis of the single piece housing;

a second backflow prevention valve in the inlet chamber of the housing coaxially aligned along the longitudinal axis of the single piece housing;

wherein the two backflow prevention valves in the inlet chamber of the housing subdivide the inlet chamber into three subchambers, wherein a subchamber formed between the two backflow prevention valves has a volume smaller than a volume of each of the other two sub-chambers;

a manually actuatable shut-off valve integrated with the housing in such a way that the manually actuatable shut-off valve is coaxially aligned with the pressure-reducing valve, said manually actuatable shut-off valve having a closed position and an open position, wherein in the closed position the manually actuatable shut-off valve keeps the pressure-reducing valve closed regardless of the outlet chamber pressure prevailing in the outlet chamber, and in the open position the manually actuatable shut-off valve allows the automatic opening and closing of the pressure-reducing valve depending on the outlet chamber pressure prevailing in the outlet chamber; and a plurality of test connection pieces integrated with the housing, including a first test connection piece located at and connected to the inlet chamber of the housing upstream of the pressure-reducing valve and a second test connection piece located at and connected to the outlet chamber of the housing downstream of the pressure-reducing valve, wherein the first test connection piece is connected to the subchamber of the inlet chamber that is formed between the two backflow prevention valves and having the volume that is smaller than the volume of each of the other two sub-chambers of the inlet chamber, wherein the pressure-reducing valve and the manually actuatable shut-off valve are inclined relative to the longitudinal axis of the single piece housing.

2. The arrangement of claim 1, wherein the first and second backflow prevention valves in the inlet chamber of the housing have identical nominal widths.

* * * * *